Dec. 25, 1962  R. E. SCHORNSTHEIMER  3,070,481
METHOD OF MAKING AN INFLATABLE ARTICLE FROM THERMOPLASTIC FILMS
Filed Dec. 27, 1955
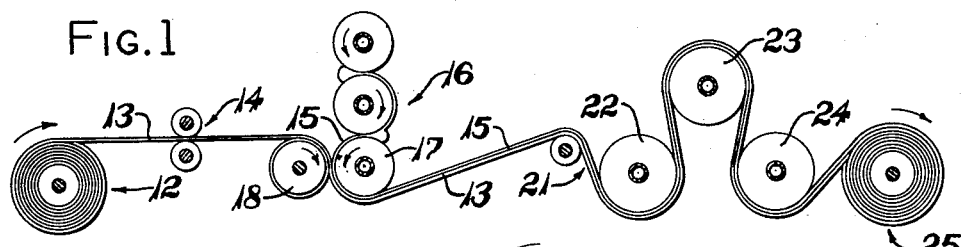
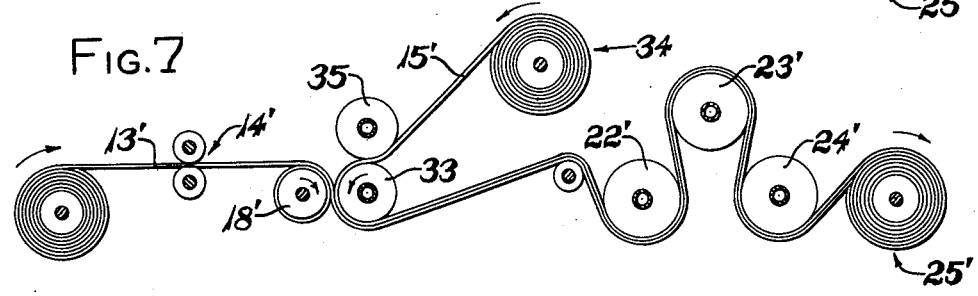
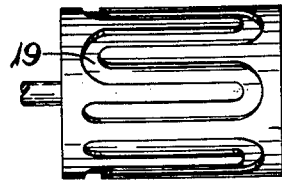
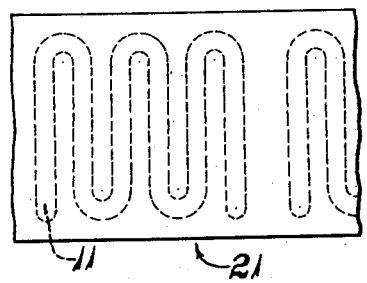
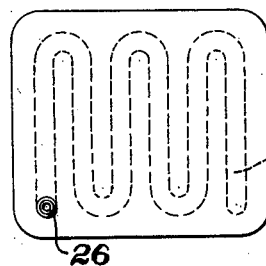
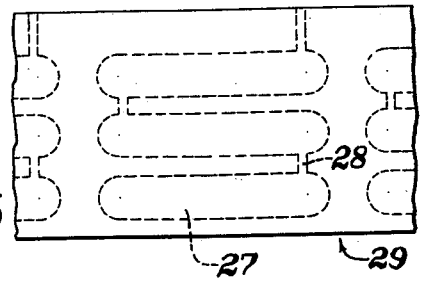
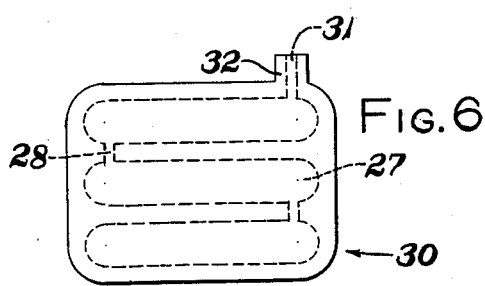
INVENTOR.
ROBERT E. SCHORNSTHEIMER
BY
ATTY.

United States Patent Office 3,070,481
Patented Dec. 25, 1962

3,070,481
METHOD OF MAKING AN INFLATABLE ARTICLE FROM THERMOPLASTIC FILMS
Robert E. Schornstheimer, Marietta, Ohio, assignor to The B. F. Goodrich Company, New York, N.Y., a corporation of New York
Filed Dec. 27, 1955, Ser. No. 555,627
1 Claim. (Cl. 156—242)

This invention relates to the manufacture of inflatable articles and, more particularly, to an improved method of making such articles from sheets or films of thermoplastic material.

The present-day extensive production of sheets and films of thermoplastic materials has made possible the manufacture of a wide variety of relatively inexpensive inflatable articles such as air cushions, air mattresses, play ponds, and other articles of similar nature. Such inflatable articles are generally made by heat sealing together selected portions of one or more sheets or films to provide interconnected passages comprising an inflation chamber, the sealing conventionally being effected through the agency of heated irons or dies with or without the use of an adhesive. This method of sealing either requires time consuming manual operations or the use of specially shaped heated dies or irons for each article of different configuration and hence is one of the most expensive steps in the manufacture of articles of this nature. Moreover, it is difficult to secure uniform strength and appearance of the seams or sealed regions especially where a large number are to be made such as are necessary to provide the plurality of interconnected inflation chambers characteristic of air cushions, mattresses, and the like. This lack of uniform strength and appearance may be tolerated in the seams or seals of articles, such as capes, raincoats, bags and similar non-inflatable articles, which are frequently turned to dispose the seams on the interior, and wherein many seams are not subjected to any appreciable stress. Such lack of uniformity of the seams is however, not acceptable for inflatable articles where every seam must be air-tight and is subjected to appreciable stress on inflation and which articles are frequently so formed that they cannot be turned inside out after manufacture to conceal the seams.

The principal object of this invention is, therefore, to provide an improved method of making inflatable articles from thermoplastic material in sheet or film form wherein the inflation chamber or chambers of the completed articles are provided as the result of adherence of the films in only selected regions during lamination of a film of the material with a second film thereof thereby eliminating the need for a separate sealing operation employing special equipment and consequently greatly reducing the cost of the article as well as providing stronger, more uniform sealing of the material at the margins of the inflation chambers.

A more specific object of the invention is to provide an improved method of making inflatable articles from thermoplastic material in sheet or film form by laminating to one sheet or film a second sheet or film while at least the latter is in a hot, plastic condition by superposing the films and exerting pressure only on portions thereof surrounding a region having a configuration corresponding to that of the inflation chamber or chambers of the completed article so that continuous portions of the films are united around the margins of the inflation chamber to which a suitable passage is provided for inflation fluid.

A still more specific object of the invention is to provide an improved method of making inflatable articles as defined above wherein the lamination is effected by pressure exerted on the films by cooperating rigid and resilient surfaces at least one of which has recesses corresponding in configuration with that of the inflation chamber in the completed article.

Another object of the invention is to provide an improved method of making inflatable articles by calendering a hot plastic film onto another film of thermoplastic material by squeezing the latter with the former as it issues from the last roll of a calender, the squeezing being accomplished by a roll with a resilient surface having recesses in the periphery corresponding in configuration to that of the inflation chamber of the completed article so that the films are united only in the portions around the inflation chamber.

Further objects and advantages of the invention will be apparent to those skilled in the art to which the invention pertains from the following description of the presently preferred embodiment, and a modification thereof, illustrated in the accompanying drawing, forming a part of this application, and in which:

FIG. 1 is a somewhat schematic representation showing the steps performed in practicing the presently preferred embodiment of the novel procedure;

FIG. 2 is an elevational view of a roll having recesses in the periphery corresponding in configuration to those of the inflation chambers in the articles made with the apparatus shown in FIG. 1;

FIG. 3 is a fragmentary top plan view of a portion of two laminated sheets or films of thermoplastic material produced by the apparatus shown in FIGS. 1 and 2;

FIG. 4 is a plan view of a completed article formed from the laminated material illustrated in FIG. 3;

FIG. 5 is a fragmentary top plan view of a portion of sheet or film material laminated in accordance with the invention to provide inflation chambers therebetween with configurations different from that shown in FIGS. 3 and 4 for the formation of articles of somewhat different nature;

FIG. 6 is a plan view of one article formed from the material shown in FIG. 5; and FIG. 7 is a view similar to FIG. 1 but showing the steps performed in practicing the invention in a slightly different manner.

Defined in its broadest aspects, the method of this invention comprises laminating together two sheets or films of thermoplastic material with an inflation chamber therebetween resulting from union of the sheets or films only in the regions surrounding the chamber. This is achieved by superposing the sheets or films and exerting pressure thereon while at least one of the sheets or films is in a hot, plastic condition, the pressure being applied substantially concomitantly with the superposition through the agency of cooperating rigid and resilient surfaces at least one of which has recesses corresponding in configuration with that of the desired inflation chamber in the completed article. Hence laminating pressure is exerted only upon the portions of the sheets or films externally of the desired inflation chamber and the portions of the sheets or films within the margins of the inflation chamber are not adhered so that these portions of the sheets or films form the walls of the chamber.

A simple form of an inflated article formed by the procedure of this invention is the air-pillow 10 which is shown in FIG. 4 as having an inflation chamber 11 of sinuous or serpentine form with the ends thereof entirely contained within the periphery of the article. The components of apparatus which may be employed in forming such an article by the procedure of this invention are conventional and hence are only diagrammatically represented in the drawings. Thus, as shown in FIG. 1, the numeral 12 designates a roll of thermoplastic material in the form of the continuous film 13 that is to form one-half of each of a plurality of inflatable articles 10, the film being advanced from the roll 12 by suitable mechanism, such as feed rolls 14. The other half of each of the articles 10 is formed by a second sheet or film 15 composed of thermoplastic material similar in nature to that of the film 13 and is superposed thereover with the application of sufficient heat and pressure so that the two films are laminated together in all areas except those corresponding to the configuration of the inflation chambers 11 in the completed articles. As shown in FIG. 1, this lamination is preferably effected by supplying a quantity of the thermoplastic material to a calender 16 thereby forming the second film 15 which is then applied to the upper surface of the film 13 by the lower roll 17 of the calender and a cooperating roll 18 which exerts a laminating pressure upon selected portions of the films concomitantly with their superposition or contact.

The lower roll 17 of the calender has a rigid periphery, since it is formed of metal, while the periphery of the roll 18 is resilient being preferably formed of rubber or other elastomer. The surface of the roll 18 is provided with areas 19 and 20 of different elevations corresponding in configuration respectively with the inflation chamber of the articles to be formed and the regions externally of the inflation chambers. As mentioned heretofore, the articles 10 selected for illustration each has an inflation chamber 11 of sinuous or serpentine shape and hence the surface of the roll 18 has the areas 19 of like configuration and recessed radially inward of the roll surface relative to the areas 20 comprising the remainder of the roll surface.

The rolls of the calender 16 are adapted to be heated as for example, by circulation of a heated fluid therethrough. This heat, coupled with that produced by the mechanical working of the thermoplastic material in forming the film 15, causes the latter to be in a hot plastic condition as it is carried over the lower roll 17. The film 13 may be heated, if desired, by any suitable means as for example, by radiant heaters, not shown, or by the application of a heated fluid to the interiors of the feed rolls 14. Consequently, passage of the films between the rolls 17 and 18 results in lamination or union of the films 13 and 15 in the areas thereof subjected to pressure between the rolls. Due to the recesses 19 in the periphery of roll 18, the films 13 and 15 are not squeezed together and united throughout their common areas but only in the regions that pass over the portions 20 of roll 18. The portions of the films passing over the recessed areas 19 of the roll 18 are not subjected to pressure and hence these regions of the films are not united and comprise the inflation chambers 11 in the completed articles.

After lamination of the films 13 and 15, the resulting composite strip 21 is passed around suitable cooling drums such as 22, 23 and 24 which are preferably hollow and adapted to have a temperature conditioning fluid circulating therethrough as will be readily understood by those skilled in the art of handling plastic film. From the cooling drums, the laminated films, in the form of the composite strip 21, may be passed to a mechanism for severing the strip into a plurality of individual articles, each similar to that shown in FIG. 3, or the strip may be wound, as indicated in FIG. 1, upon a suitable roll 25 for subsequent separation into individual articles. The separation of the composite strip 21 into the individual articles 10 can be effected by suitable cutting dies positioned to sever the strip between the adjacent inflation chambers 11 which die or dies can also round the corners or effect other alterations in the outer shape of the articles. A suitable inflation valve 26 is then affixed to each of the separate articles 10 thus providing the passage for communication with the inflation chamber 11 which is formed by the adherence of films 13 and 15 along the margins of the chamber.

It will be apparent that, by the procedure just described, inflatable articles may be made at a high rate of speed and at very low cost since the use of heated irons, dies or the like to effect sealing and formation of the inflation chamber are eliminated, this chamber now being formed as an incident to the lamination of the two films together. This operation cannot only be more rapidly effected, but also results in more uniform and stronger seals than is possible with conventional heat sealing methods and procedures. Moreover, special heat sealing equipment and operators skilled in the use of such equipment are no longer necessary.

The shape of the inflation chambers for the articles may be varied from that shown in FIGS. 2 and 3 to any desired form by changing the recesses employed on the periphery of the roll 18. Thus, the roll 18 may be provided with recesses such as to form successive groups of spaced, parallel, elongated regions 27 connected by staggered transversely extending regions 28 where the two films are not united, see FIG. 5, which regions constitute an inflation chamber in a completed article. The films provided with the non-adhered regions 27 and 28 may be laminated in the manner shown in FIG. 1, after which the resulting composite strip 29 is severed between adjacent inflation chambers and the excess material is trimmed from each severed unit to provide a substantially rectangular article 30 (see FIG. 6) having a laterally extending inflation passage 31 bounded by sealed margins 32. This inflation passage 31 is formed by having an axial recess 19 in the roll 18 extending to, or adjacent to, a side face of the roll. Hence, when the second film 15 is laminated over the film 13 adherence is secured at either side of this portion of the films so that when the article is trimmed to the shape shown in FIG. 6, the inflation chamber remains open through the passage 31 in the resulting narrow neck of the article. Consequently, the article 30 may be inflated by mouth and the inflation air retained therein by constricting the opening 31 through the use of a clamp, rubber band or other suitable expedient.

The film of thermoplastic material which is laminated with the first film need not be supplied by forming the second film just prior to its lamination with the first film as indicated in FIG. 1. Instead, the second film may, like the first film, be supplied from a roll of previously formed strip and the two films laminated by cooperating rolls, one of which has a rigid surface and the other of which has a resilient surface of rubber or other elastomer and with the periphery of one of the rolls provided with recesses corresponding in configuration with the inflation chambers of the completed articles. This procedure is indicated in FIG. 7 wherein parts of apparatus identical with those in FIG. 1 have the same reference numerals but with prime marks added. As shown in FIG. 7, a first film 13' is fed by the rolls 14' between a driven hollow metal roll 33 and a pressure applying roll 18' having a rubber surface provided with recesses corresponding to the shape of the inflation chamber of the article as will be readily understood with reference to the previous description of the roll 18 of FIG. 1. A second film 15' is supplied from a roll 34 thereof by suitable means which may comprise a driven roll 35 cooperating with the driven roll 33 to advance the film over the latter into laminating relationship with the film 13'. The rolls 33 and 35 are preferably hollow and may be heated by a suitable fluid circulated therethrough so that the film 15' is supplied to the film 13' in a hot plastic condition and hence the films are united only in the areas surrounding the region corresponding to the inflation chambers of the completed articles. If desired, the film 13' may also be heated, by suitable means not shown, prior to contacting film 15'. The composite strip or film is then cooled on the drums 22', 23' and 24' after which it may be severed into discrete units or wound upon the take-up roll 25′, as in the embodiment illustrated in FIG. 1, for subsequent severing to form the individual articles. Each of the discrete articles thus produced is then provided with its own passage to the inflation chamber contained within the margins of the article as will now be readily understood.

It will be apparent that apparatus other than that illustrated and described herein may be employed to practice this invention. Thus, it is not necessary that the articles made from films be in the nature of continuous strips since separate sheets may be employed. Moreover, the first film may be formed by a calendering operation effected upon the thermoplastic material prior to passing the film between the laminating rolls so that it is not necessary to supply the first film in the form of a completed roll thereof as is illustrated in the drawing. Finally, it should be noted that the principles of this invention are applicable to formation of inflatable articles other than air pillows of the shapes shown in the drawings.

The thermoplastic materials which may be employed in accordance with this invention are any of the well-known plastics which are heat sealable and flexible of which vinyl film may be mentioned as representative and polyvinyl chloride is presently preferred. However, other materials may be employed and apparatus components other than those here disclosed in detail or mentioned by way of example, may be utilized without departing from the principles of the invention. Hence, the invention is not to be considered as limited to the specific details here illustrated and described except as may be required by the spirit and scope of the appended claim.

Having thus described the invention, I claim:

The method of making an inflatable article comprising providing a roll having a resilient periphery with recesses in the surface thereof corresponding to the configuration of the inflation chamber of the completed article, passing a first thermoplastic film between said roll and the cooperating heated roll of a calender on which a second film of thermoplastic material is being formed to thereby exert pressure upon and cause adhesion of the said films only in the regions contacted by the non-recessed portions of the first-mentioned roll thereby providing sealed margins around a non-adhered region comprising an inflation chamber located between the films, and providing said films with a passageway to the said chamber.

References Cited in the file of this patent

UNITED STATES PATENTS

| | | |
|---|---|---|
| 1,719,290 | Danielson | July 2, 1929 |
| 1,920,961 | Anderson | Aug. 8, 1933 |
| 2,522,079 | Winstead | Sept. 12, 1950 |
| 2,621,138 | Messing | Dec. 9, 1952 |
| 2,621,139 | Messing | Dec. 9, 1952 |
| 2,633,442 | Caldwell | Mar. 31, 1953 |
| 2,670,501 | Michiels | Mar. 20, 1954 |
| 2,675,053 | Clemens | Apr. 13, 1954 |
| 2,739,093 | Bull | Mar. 20, 1956 |
| 2,771,388 | Rocky et al. | Nov. 20, 1956 |

FOREIGN PATENTS

| | | |
|---|---|---|
| 841,794 | Germany | June 19, 1952 |